(12) United States Patent
Popa et al.

(10) Patent No.: US 10,796,723 B2
(45) Date of Patent: Oct. 6, 2020

(54) SPATIALIZED RENDERING OF REAL-TIME VIDEO DATA TO 3D SPACE

(71) Applicant: Immersive Licensing, Inc., Los Angeles, CA (US)

(72) Inventors: Alexander Popa, Carrolton, TX (US); S. Lance Van Nostrand, Plano, TX (US)

(73) Assignee: Immersive Licensing, Inc., Los Angeles, CA (US)

( * ) Notice: Subject to any disclaimer, the term of this patent is extended or adjusted under 35 U.S.C. 154(b) by 200 days.

(21) Appl. No.: 15/606,488

(22) Filed: May 26, 2017

(65) Prior Publication Data

US 2018/0342267 A1    Nov. 29, 2018

(51) Int. Cl.
| | |
|---|---|
| *H04N 9/80* | (2006.01) |
| *G11B 27/036* | (2006.01) |
| *H04N 5/93* | (2006.01) |
| *H04N 5/232* | (2006.01) |
| *H04N 21/81* | (2011.01) |
| *H04N 21/218* | (2011.01) |
| *H04N 21/234* | (2011.01) |
| *H04N 21/2187* | (2011.01) |
| *H04N 9/87* | (2006.01) |

(52) U.S. Cl.
CPC ....... *G11B 27/036* (2013.01); *H04N 5/23238* (2013.01); *H04N 5/9305* (2013.01); *H04N 9/8715* (2013.01); *H04N 21/2187* (2013.01); *H04N 21/21805* (2013.01); *H04N 21/23412* (2013.01); *H04N 21/816* (2013.01); *H04N 21/8133* (2013.01)

(58) Field of Classification Search
CPC ............... G11B 27/036; H04N 9/8715; H04N 21/2187; H04N 21/23412; H04N 21/21805; H04N 21/816; H04N 5/23238; H04N 5/9305; H04N 21/8133
USPC ............................................. 386/240; 348/36
See application file for complete search history.

(56) References Cited

U.S. PATENT DOCUMENTS

| | | | | |
|---|---|---|---|---|
| 2001/0056574 | A1* | 12/2001 | Richards | G06F 3/011 725/36 |
| 2011/0102678 | A1* | 5/2011 | House | H04N 9/75 348/584 |
| 2013/0312041 | A1* | 11/2013 | Gresta | H04N 21/2365 725/61 |
| 2014/0340404 | A1* | 11/2014 | Wang | G06T 19/006 345/427 |
| 2018/0075652 | A1* | 3/2018 | Kim | G06T 19/003 |
| 2018/0332265 | A1* | 11/2018 | Hwang | H04N 13/161 |

* cited by examiner

*Primary Examiner* — Helen Shibru
(74) *Attorney, Agent, or Firm* — Chernoff, Vilhauer, McClung & Stenzel, LLP

(57) ABSTRACT

A 360 video is presented in a three dimensional (3D) environment. Rather than simply stacking graphics in two dimensions, graphics are placed using both 3D models and textures. The 3D models may be altered so that the texture is aligned in three dimensions into the 360 video space. An instance of a 3D model combined with a key and fill texture form a group. The group has a 3D orientation and placement so that the group as aligned into the 360 degree video space may not be visible from all user look directions. The inserted groups, including live video as well as static graphics, may be projected into either mono or stereo views to give the viewer a sense of space, depth, and orientation.

24 Claims, 6 Drawing Sheets

SPATIALIZED RENDERING OF REAL-TIME VIDEO DATA TO 3D SPACE

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Television video and camera graphics have mature methods of placing overlay graphics on a two-dimensional (2D) image. A video key and fill are placed over another background at a given location in the 2D space. These techniques do not transfer well to 360 degree graphics. 360 degree graphics have an inherent three-dimensional (3D) aspect so that backgrounds tend to have curvilinear orientations. A 2D overlay does not account for the shape of the graphics after projection into the 3D space. Existing solutions for real time control of live video also do not address the environment where an overlay graphic may not be in the field of view of every viewer because viewers may be watching different regions of the 360 degree video space.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A system uses 3D models as a target for key and fill graphic placement in a 360 degree video space. An instance of a 3D model is combined with a video texture developed from two dimensional (2D) key and fill graphics, including 2D video, to form a group. The group may be placed in a 3D space to match physical locations in the video space, for example, in a sports venue behind a playing field or next to a goal. The system may store multiple 3D models and may map the same or different key and fill graphics to selected 3D models to create preset groups. A selected group or groups may be placed in the 360 degree video space and output as a 3D key and fill for combining with the real time base video product. Multiple groups may be maintained in an overlay set for easy selection and use during a live broadcast. A single group may be duplicated in the 360 degree video space. This may help to ensure that a particular graphic is visible from all possible look angles when a viewer is using a 360 degree viewing platform.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
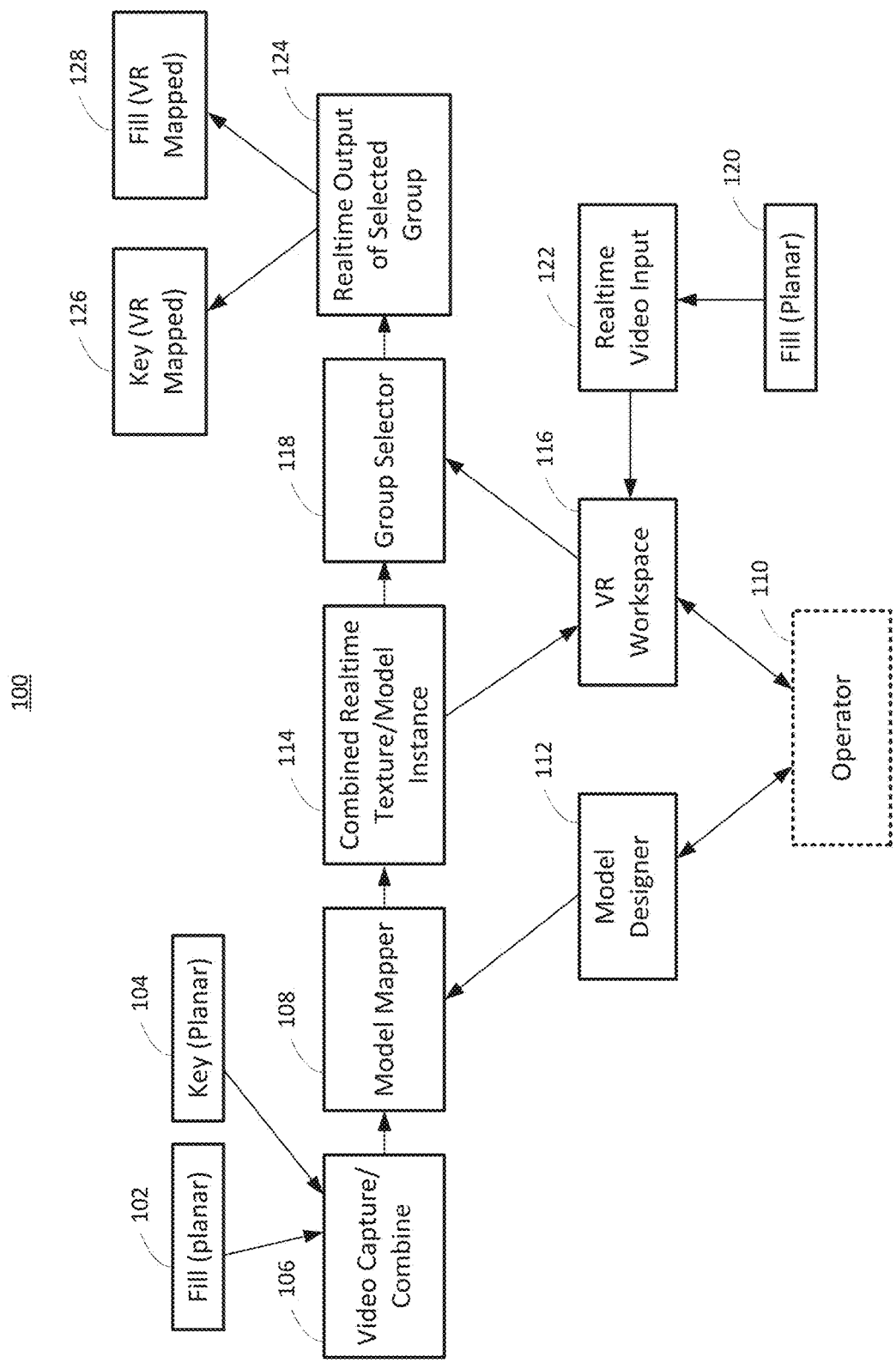
FIG. 1 is a block diagram illustrating a system dataflow in accordance with the current disclosure.

A system 100 for spatialized rendering of real-time video data to three dimensional (3D) space is illustrated in a functional block diagram in FIG. 1. The system 100 allows key and fill graphical data, including live video, to be mapped into a 360 degree, 3D video space. Traditional two dimensional key and fill platforms are unable to match the inherently curvilinear space of a 360 degree video backdrop and are further unable to generate the necessary stereographic views to create a 3D effect to correctly place such a graphic in a 3D "world." For example, a simple score box with teams, score, time remaining, etc., may be generated as an overlay for a 3D view of a football game. However, lacking any depth concept, a 2D graphic placed in the field of view may appear directly on the field of play, rather than over an existing real-world scoreboard. Further, in environments where a user is able to navigate in a 3D space, the graphic must be correctly placed in the 3D space so that a user perceives the graphic in the correct location from every viewing location. In another example, a simple green screen sign on a wall behind home plate in a baseball game provides a key for a fill graphic to be electronically placed on the wall. Perspective in the 2D view is accommodated by using a 2D geometry, e.g., a rhombus, to depict the oblique angle of the green screen on the wall with respect to a centerfield camera. Placing such a graphic in a 3D, 360 degree video environment is beyond the capability of a current video key system because the necessary depth information cannot be comprehended by the simple 2D geometry. An attempt to fit a 2D graphic coordinate system into the 3D environment may result in the overlay graphic floating in space and being distorted rather than being depicted on the wall, as desired.

The system 100 addresses this shortfall in the current systems by providing a 3D model that can be placed into a scene so that depth as well as azimuth and elevation are accounted for in the projected scene. In an embodiment, the system 100 may include a fill input 102 and a key input 104 that feed data to a video capture device 106. The video capture device 106 may receive key and fill video input at an arbitrary resolution and framerate and normalize the input to a standard output that will be compatible with the ultimate broadcast environment. After normalization, if necessary, the video capture device 106 uses the key and fill data to create a texture that is passed to a model mapper 108. As illustrated, the video capture device 106 has only one key/fill input pair 102, 104, but in various embodiments the video capture device 106 may support multiple key/fill inputs.

The model mapper 108 may be used to select a 3D model that suits the ultimate projection need. In an embodiment, a model designer 112 may be used to generate a library of 3D models or may be used to generate a model in real time to meet the need of a particular key/fill pair. The model mapper 108 may generate an instance of a selected model so that both the selected instance of the model and the key/fill data are presented to a compositor 114 that combines the real time texture with the model instance to create a group.

A virtual reality (VR) workspace editor 116 may be used to orient and place the group in the 3D, 360 degree video space. This may be accomplished via a user interface (see FIG. 5) that allows an operator 110 to view the extent of the 360 degree video space and place and orient the instance in the 360 degree video space. While the operator 110 may interact with the system 100, the operator is not part of the system 100. The VR workspace editor 116 may also be used to combine different instances into an overlay set so that several graphics can be inserted into different areas of the 360 degree video space at the same time. In an environment where an end viewer may be able to interact with the media, for example, through head motions, hand gestures, etc., the use of overlay sets may be useful in presenting customized presentations with different graphics made available on each stream or in a "presentation-of-one" narrowcast. That is, a viewer may be able to select custom graphics (inset videos and graphical overlays) for his or her own individual viewing experience through the use of back-channel communications with the system 100.

In an embodiment, a real time video input 122 may receive a fill 120 of the background broadcast so that the operator 110 can view the actual video background in the VR workspace editor 116 to aid in the orientation and placement of each instance or overlay set.

A group selector 118 may be used under the control of the operator 110 to select one or more groups to be selected for output. The group selector 118 may have multiple groups or overlay sets queued and ready for selection to allow an operator to rapidly switch between different fills in different locations in the 360 degree video space. Each group or overlay set may be different instantiations of one key/fill so that the same key/fill can be placed in multiple locations in the 360 degree video space. In addition, different groups or overlay sets may incorporate different key/fill content allowing simultaneous placement of different content at various locations in the 360 degree video space.

An output module 124 generates a new VR mapped key and fill for each selected group so that the key and fill are oriented and placed into the 360 degree video space at the correct azimuth and elevation. Additionally, when 3D effects are being used, the output module 124 generates the stereo view of the group or groups to be presented. A key signal 126 and a corresponding fill signal 128 are delivered by the output module 124 for integration by a video switcher into the broadcast output.

Because the background fill content, e.g., a 360 degree broadcast of a sporting event, may be available via the real time video input 122, one embodiment of the system 100 provides for combination of the key 126 and fill 128 content with the background video.

Figure 2:
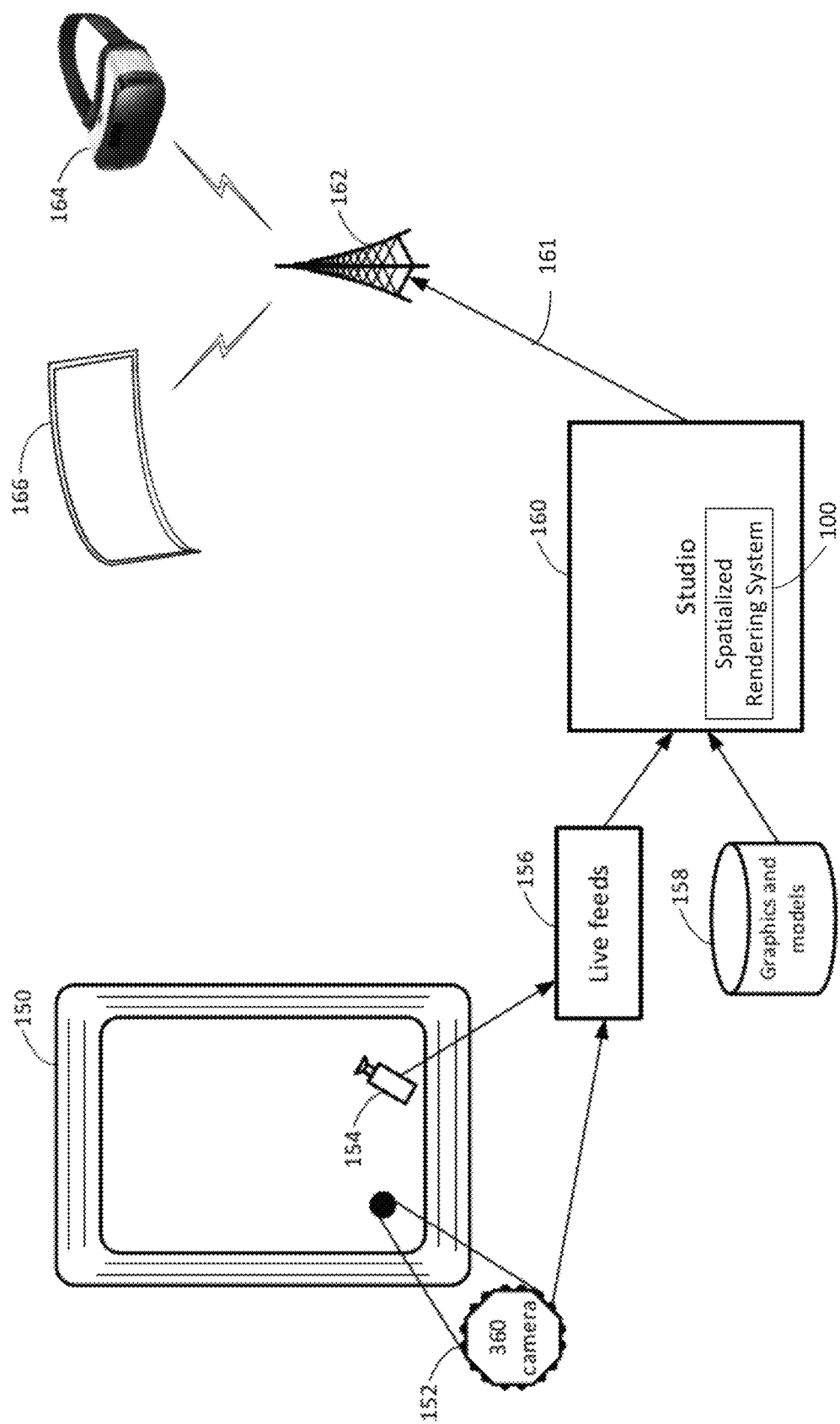
FIG. 2 is a block diagram of a first embodiment for utilizing a spatialized rendering of video to a 3D space.

FIG. 2 illustrates one use case of the system 100 in a live entertainment setting, such as a stadium 150. A 360 degree camera 152 and a traditional video camera 154 may both provide signals to an input system 156. Graphics and models may be generated and stored in a database 158. For example, sightlines from the different features of the stadium 150, such as scoreboards, green screens, etc., may have models adapted to match sightlines from the 360 degree camera, just as the system that renders first down lines in football broadcasts is calibrated for each camera position.

The database 158 may also include graphics used to present various information to viewers, such as, player statistics, team facts, commercials or advertising "bugs," etc.

Both the live feeds from the input system 156 and the graphics from the database 158 may be fed to the studio 160. In the illustrated embodiment, the studio 160 incorporates the spatialized rendering system 100 so that the video feed or feeds and graphics can be oriented and placed into the 360 degree background video as described above.

A broadcast signal including VR mapped key 126 and VR mapped fill 128 are integrated into a broadcast signal 161, that may be output via a transmitter 162 to a plurality of receiving devices, such as, but not limited to, a curved display television set 166 or a 3D/360 degree headset 164. While FIG. 2 depicts a transmitter for use in an over-the-air environment, it will be understood that many, if not most, transmissions may be made via streamed data connections over wired or wireless wide area networks.

Figure 3:
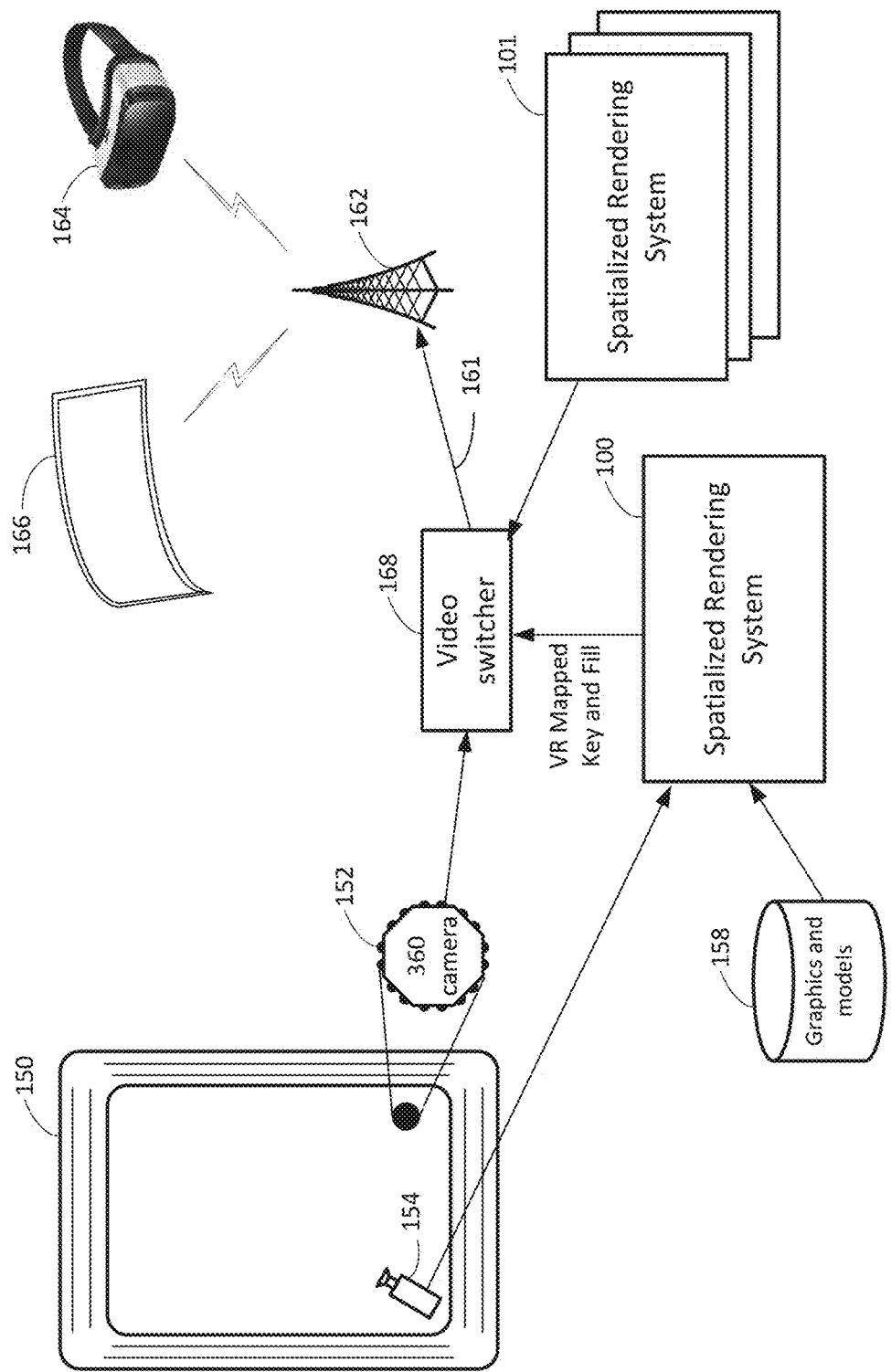
FIG. 3 is a block diagram of a second embodiment for utilizing a spatialized rendering of video to a 3D space.

FIG. 3 illustrates another embodiment of the spatialized rendering system 100 in a standalone environment. In this embodiment, the 360 degree camera 152 sends its output directly to a video switcher 168 where the VR mapped key 126 and VR mapped fill 128 are combined in third party process at the discretion of an operator of the video switcher 168. For example, VR mapped key and fill data 126, 128 may be produced by one or more additional spatialized rendering systems 101 to accommodate, for example, different languages or levels of graphical information.

Figure 4:
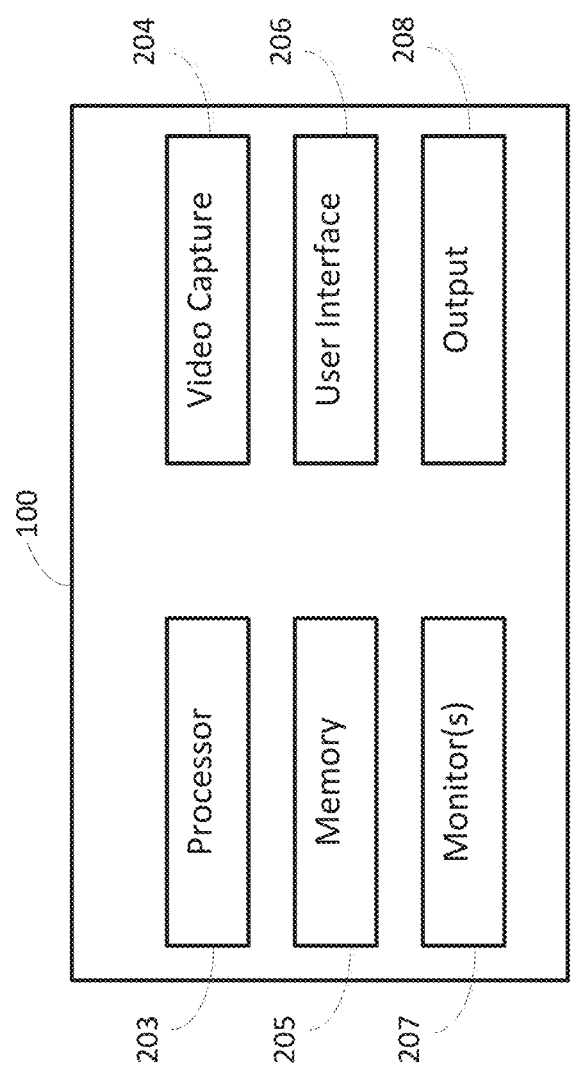
FIG. 4 is a physical block diagram of an exemplary spatialized rendering system in accordance with the current disclosure.

FIG. 4 may be a physical block diagram of an exemplary spatialized rendering system 100 in accordance with the current disclosure. The system 100 may include a processor 203 that executes software instructions that cause the system 100 to capture data, receive inputs, perform functions, and generate output signals. The processor 203 may be any of a number of processors known in the art. The processor 203 may include multiple chips or parallel processing units that improve performance for the often processor-intensive activities associated with real time digital video manipulation.

Input signals, such as fill 102 and key 104 data may be received at a video capture unit 204, that may be the same or similar to the video capture device 106. The video capture unit 204 may include a separate processor (not depicted) and software for combining the fill 102 and key 104 data into a texture for inclusion into a model in a downstream process.

A memory 205 may store executable instructions as well as data corresponding, for example, to models and key/fill data. The executable instructions may include both operating system code and program code related to the implementation of functions of the spatialized rendering system 100.

The system 100 may include a monitor 207 or another suitable graphical display unit that allows an operator 110 to view and insert key/fill data or textures, models, groups, a 360 degree workspace, and/or 360 degree video background data, such as a live event. The monitor 207 may include a number of separate 2D display devices or a virtual reality headset so that an operator 110 is able to comprehend the full background, i.e., the 360 degree video content. In the case of 2D display devices, the full content may be available from one viewing angle but with a possible side effect of having overlapping areas on adjacent display devices or in some cases lacking a correct sense of depth. A VR headset, that is a 3D and/or 360 degree viewing platform, may allow accurate portrayal of the background scene but may prevent the operator from seeing all portions of the viewable space at the same time. In either case, the operator 110 may use the images on the monitor 207 to place and orient models, assign key/fill data to models to form a group, assign groups to an overlay set, and select a group and/or overlay set for inclusion in the VR mapped Key 126 and fill 128.

Figure 5:
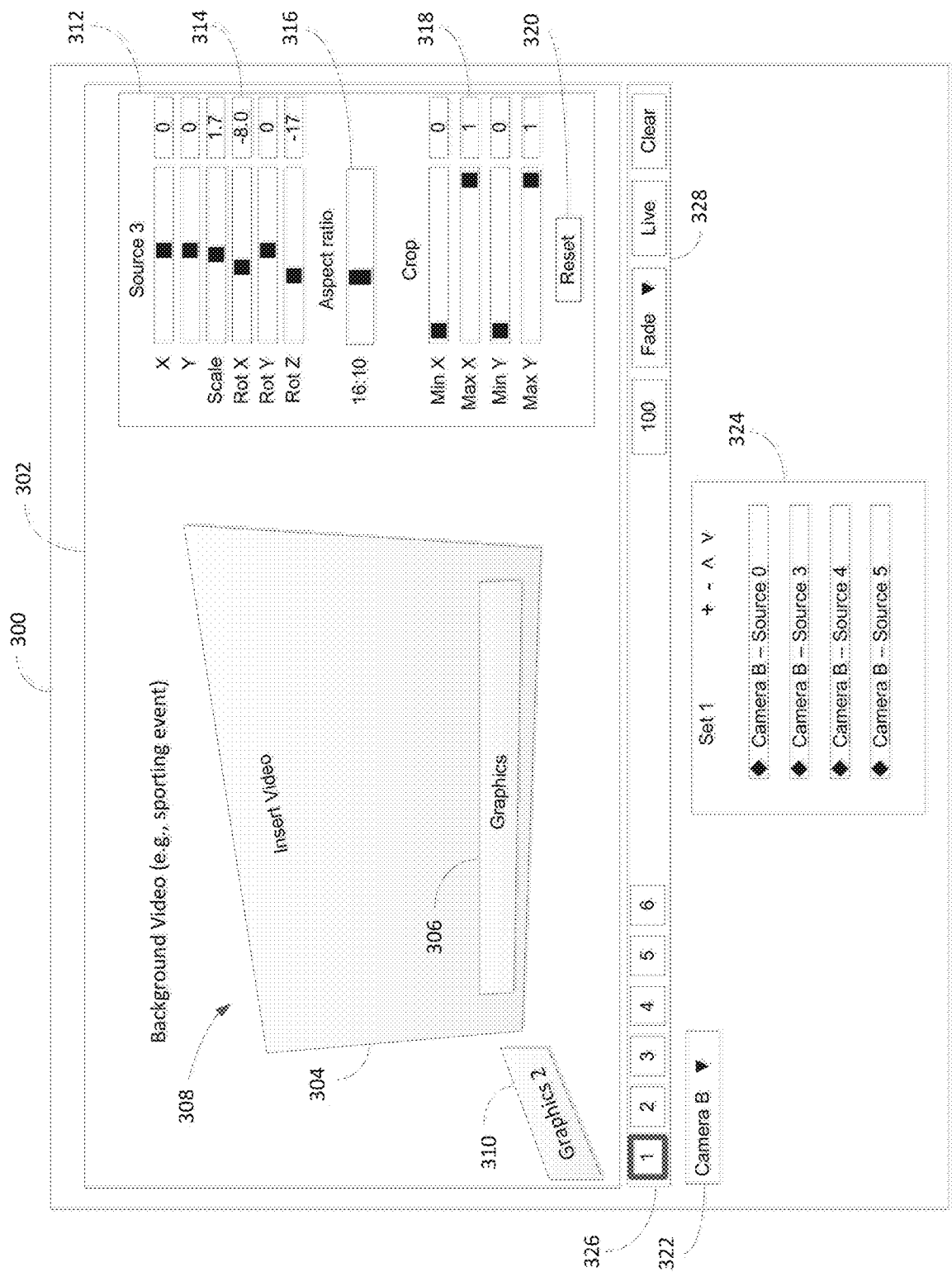
FIG. 5 is an exemplary screen shot illustrating a graphical user interface supporting spatialized rendering of video in a 3D space.

FIG. 5 represents an exemplary screen 300 depicting graphics supported by a user interface 206 of the system 100. A background video window 302 may display the background video from, for example, the 360 degree camera 152. The background video window 302 may display the images from the 360 degree camera 152 using a spherical projection so that all the background video content is visible to an operator. A first group 304, combined with a second group 306 into an overlay set 308 may be displayed on the background video window showing azimuth and elevation within the background video. Another group 310 is also illustrated showing a different location and orientation with respect to the background video content. An orientation window 312 may be used to orient the group 310 or the overlay set 308. Sliders 314 may control the x and y positions, scale, and the rotation of the selected group in three dimensions. An aspect ratio slider 316 may be used to tailor the selected group to inherent characteristics of the background video while a cropping tool 318 allows the selected group to be cut to suit the needs of a director or editor. A reset button 320 allows previously applied controls to be set back to an original state.

A first control 322 allows selection of a camera as a video feed while another graphical control 324 supports mapping the control to a group or overlay set. As illustrated by control 324 in this example, the input from camera B is mapped to multiple groups or overlay sets. A selector 326 allows selection of a 3D model while a more conventional control area 328 allows control of the output signal with respect to opacity, transition type, and output.

Figure 6:
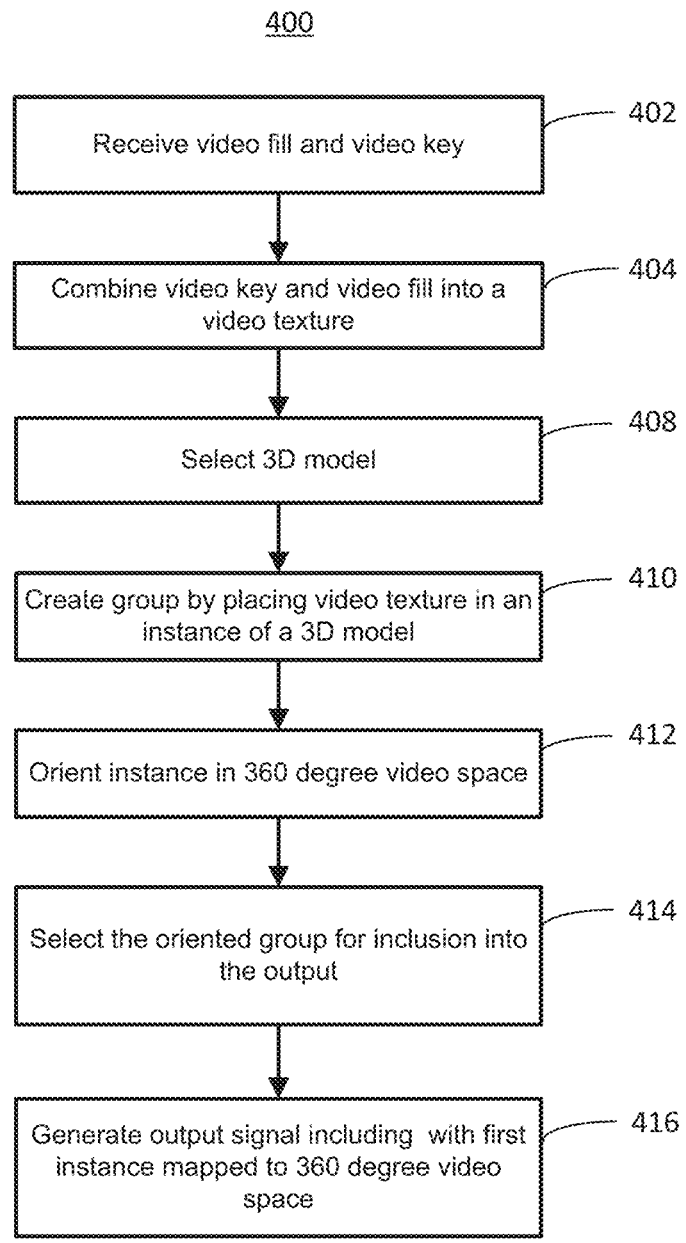
FIG. 6 is a flowchart of a method of performing spatialized rendering of video in a 3D space.

A flowchart of a method 400 of spatialized rendering of video data into a three dimensional space is depicted in FIG. 6. At a block 402, a video fill and video key are received via a video capture device 106 and combined to create a video texture at block 404. A model designer 112 may be used to create 3D models that may be stored and subsequently selected at block 408. The selected 3D model may be chosen to accommodate a specific graphic or video or to have a specific orientation within a background video. Once the 3D model is selected, an instance of the 3D model may be combined with a texture at block 410 to create group. In an embodiment, multiple groups may be created and stored, each group having a different composition of, for example, graphics and video content. Multiple groups may be combined into an overlay set. The overlay set may include two or more groups that are entirely different or may contain multiple copies of the same group. The latter case may occur when it is desirable to have the group visible from more than one, or all, possible viewing angles in the 360 degree video space.

At block 412, a user interface may be used to orient the group within the background video, when available via a real time feed 122, or within a general 360 degree video space when the background video is not available. The group, or overlay set, may be oriented by azimuth and elevation within the 360 degree video space, but may further be oriented in X, Y, and Z space so that the group is placed in a 3D space within the 360 degree video space. In an embodiment, this step further involves generating stereoscopic views for the left eye and right eye in a suitable 3D viewing environment, such as a headset 164 capable of 3D and/or 360 degree video presentations.

A group, multiple groups, or an overlay set may be selected at block 414 for inclusion in an output signal. An output device 208, at block 416, may generate the output signal that includes a VR mapped key 126 and a VR mapped fill 128 for use by a downstream video mixer or other studio gear that includes the VR mapped key 126 and fill 128 into a broadcast signal 161.

The producers of 360 degree video content benefit from the ability to generate graphics that are well oriented to the video space into which the graphics are being placed. Unlike existing 2D key and fill systems, a system in accordance with the current disclosure uses models that match the unique curvilinear, and often 3D, aspects of a 360 degree video space. The system further recognizes that in a 360 degree space not every user will necessarily have a look angle that encompasses an overlay graphic and offers an ability to duplicate an instance or overlay set to ensure an end viewer will see graphical data at every look angle.

A technical effect of the video processing system 100 is to allow real time selection 3D video and graphical overlays to be generated to match the inherently curvilinear, and in some cases 3D space, of a 360 degree video space.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A video processing system comprising:
 a video capture device that receives a video fill and a video key, the video capture device combining the video fill and video key into a video texture;
 a model mapper that selects a first three dimensional (3D) model from a plurality of 3D models for mapping into a 360 degree video space;
 a compositor that places the video texture over an instance of the first 3D model to generate a first group;
 a virtual reality workspace editor that, responsive to an instruction, orients the first group by azimuth and elevation into the 360 degree video space and places the first group at a relative depth in the 360 degree video space; and an output that transmits an output signal including the first group mapped into the 360 degree video space.

2. The video processing system of claim 1, further comprising:

a memory that stores a plurality of groups including the first group; and a group selector that receives a selection of one or more of the plurality of groups for inclusion into the output signal.

3. The video processing system of claim 1, further comprising a model designer that generates the first 3D model.

4. The video processing system of claim 1, wherein the output signal includes a 3D key component and a 3D fill component, each of the 3D key component and the 3D fill component mapped into the 360 degree video space.

5. The video processing system of claim 1, further comprising a real-time video input that receives a live video signal.

6. The video processing system of claim 5, wherein the live video signal is mapped into another instance of one of the plurality of 3D models to generate a second group.

7. The video processing system of claim 1, wherein the output signal includes the first group having an azimuth and elevation for orientation in the 360 degree video space.

8. The video processing system of claim 7, further comprising a user interface that interacts with the virtual reality workspace editor for orienting the first group within the 360 degree video space.

9. A method of processing video in a 360 degree video space, the method comprising:

receiving a video fill and a video key;

combining the video fill and the video key into a video texture;

selecting a 3D model from a plurality of 3D models;

placing the video texture into an instance of the 3D model to create a first group;

orienting the first group by azimuth and elevation in the 360 degree video space and placing the first group at a relative depth in the 360 degree video space; and generating an output signal with the first group mapped into the 360 degree video space.

10. The method of claim 9, further comprising:

storing a plurality of groups including the first group; and receiving a selection of one or more of the plurality of groups for inclusion into the output signal.

11. The method of claim 9, further comprising generating the 3D model via a model designer.

12. The method of claim 9, wherein generating the output signal with the first group comprises mapping a key component and a fill component of the first group into the 360 degree video space.

13. The method of claim 9, further comprising receiving a live video signal via a real time video input.

14. The method of claim 13, further comprising, generating a second group by mapping the live video signal into another instance of one of the plurality of 3D models.

15. The method of claim 1, wherein orienting the first group in the 360 degree video space comprises:

presenting a representation of the 360 degree video space via a user interface; and receiving, via the user interface, an instruction for orienting the first group within the 360 degree video space.

16. The video processing system of claim 1 wherein the virtual reality workspace editor orients a second instance of the first group by azimuth and elevation into the 360 degree video space and places the second instance of the first group at a relative depth in the 360 degree video space.

17. The video processing system of claim 1 comprising a communication interface, wherein the model mapper selects the first 3D model from the plurality of 3D models in response to a command received from a viewer via the communication interface.

18. The video processing system of claim 1 wherein the relative depth is selected such that the first group is placed closer to the viewer than a 360 degree background video represented in the 360 degree video space.

19. The video processing system of claim 1 wherein the first group and a background video represented in the 360 degree video space are both represented in a 3D, 360 degree video space and the relative depth is selected such that the first group is placed in concomitant 3D space with the background video in the 3D, 360 degree video space.

20. The video processing system of claim 19 wherein the 3D, 360 degree video space generated using stereoscopic views.

21. A video processing system comprising:

a compositor that places a video texture over an instance of a 3D model to generate a first group, the first group including a mapped key component and a mapped fill component;

a virtual reality workspace editor that, responsive to an instruction, orients the first group by azimuth and elevation into a 360 degree video space and places the first group at a relative depth in the 360 degree video space; and an output that transmits an output signal that includes the first group mapped to the 360 degree video space.

22. The video processing system of claim 21, further comprising a model mapper that maps the video texture into a 3D model, the model mapper including a selector for picking the 3D model from a plurality of 3D models.

23. The video processing system of claim 21, further comprising a video capture unit that receives a video fill and a video key and combines the video fill and the video key to generate the video texture.

24. The video processing system of claim 21, further comprising a user interface that presents a representation of the 360 degree video space and receives an instruction for placing multiple copies of the first group into the 360 degree video space to ensure viewing at every look angle in the 360 degree video space.

* * * * *